Feb. 3, 1953 — E. HALPERN — 2,627,164

ROTARY PUMP AND TURBINE HYDRAULIC COUPLING

Filed Jan. 3, 1949

INVENTOR
ERNST HALPERN
BY
ATTORNEY

Patented Feb. 3, 1953

2,627,164

UNITED STATES PATENT OFFICE 2,627,164

ROTARY PUMP AND TURBINE HYDRAULIC COUPLING

Ernst Halpern, St. Louis, Mo.

Application January 3, 1949, Serial No. 68,848

3 Claims. (Cl. 60—54)

This invention relates in general to power transmissions and more particularly to certain new and useful improvements in rotary pump and turbine hydraulic coupling.

The primary object of the present invention is to provide a torque converter wherein the driving shaft is provided with a fluid-propelling worm adapted automatically to alter its normal pitch through compression to accommodate increases in the pressure of the fluid caused by additional torque loads.

A further object of the present invention resides in the provision of a torque converter having manually controlled valve means for reducing the pressure of the fluid to permit control of the degree of hydraulic interlocking of the driving and driven members.

An additional object of the present invention is to provide torque converter means which, having a simplicity of parts, may be economically produced and which is reliable and durable in operation.

With the above and other objects in view, my invention resides in the novel features of form, construction, arrangement, and combination of parts presently described and pointed out in the claims.

In the accompanying drawing—

Figure 1:
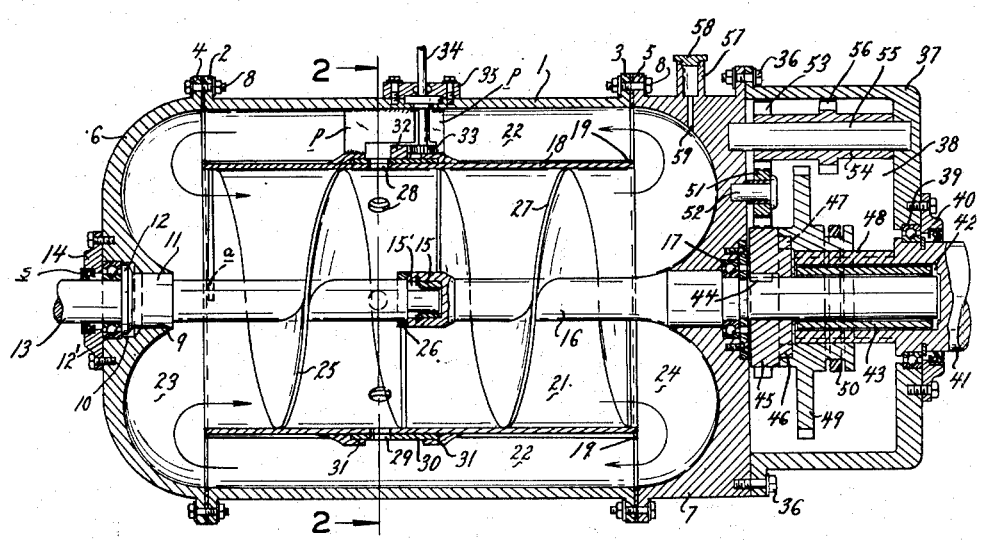
Figure 2:
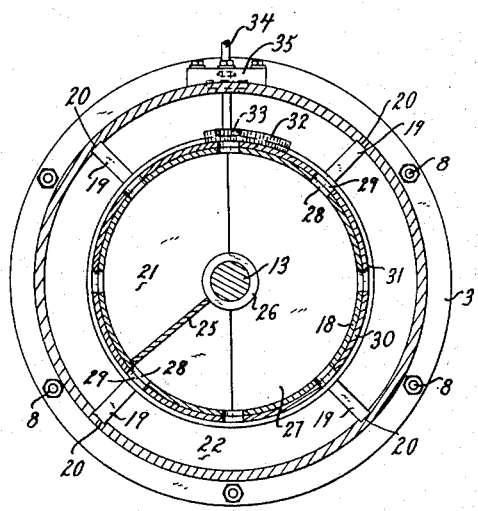

Figure 1 is a longitudinal sectional view of a torque converter constructed in accordance with and embodying the present invention; and Figure 2 is a transverse sectional view taken along line 2—2 of Figure 1.

Referring now in detail by reference characters to the drawing which illustrates a preferred embodiment of my invention, 1 designates a cylinder-like casing or housing having at each end out-turned annular flanges 2, 3, for registration with corresponding flanges 4, 5, of removable heads 6, 7, respectively. The flanges 2 and 4, and 3 and 5 are provided with registering apertures for the reception of threaded bolts 8.

The head 6 is centrally provided with an axial bore 9 having a counterbore 10 for receiving a diametrally enlarged portion 11 and thrust shoulder 12 of a driving shaft 13, the shoulder 12 bears against a conventional thrust bering 12' and outwardly thereof, the shaft 13 projects through a conventional rotary seal s and is suitably connected at its outer end to a conventional type mover (not shown). A bearing cap 14 is secured to the outer face of the head 6 about the shaft 13. The inner end of the driving shaft 13 is diametrally decreased and is retained within an anti-friction bearing or sleeve 15 disposed within a circular recess or bearing 15' formed in the inner diametrally increased end of an axially aligned driven shaft 16 rotatably supported by a bearing 17 in the head 7 and projecting therethrough.

Disposed within and concentric with the casing 1 is an open end tube 18 supported throughout its length by radially extending axial fins or struts 19 which fit snugly into axial grooves 20 formed on the inner face of the casing 1. At their inner margins, the struts 19 are welded or otherwise suitably secured to the tube 18. The disposition of the tube 18 in the casing 1 forms a longitudinally extending inner fluid passageway 21 and an outer concentric fluid passageway 22 which are, in communication at their ends by the inclusion of chambers 23, 24, in the heads 6, 7, respectively.

Disposed encirclingly about the driving shaft 13 is a driving helix or self-adjusting worm 25, fabricated preferably of spring stud, and being pinned at one end thereof to the driving shaft 13, by a radial pin a which can rotate slightly about its longitudinal axis as the worm 25 adjusts its pitch in the manner hereinafter more fully described. At its other or free end the worm 25 is provided with a collar 26 rotatably and shiftably mounted on the shaft 13 and adapted normally to abut against the inner end face of the driven shaft 16. Between the collars 26 and the point of attachment a, the worm is free to rotate and slide relative to the shaft 13.

Rigidly secured encirclingly to the driven shaft 16 is a driven worm 27, similar in construction to the worm 25, but being, by its securement, non-compressible whereby the pitch thereof will remain at all times constant. The outer margins of the worms 25, 27, snugly engage against the inner surface of the tube 18.

Provided about the tube 18 is a plurality of spaced apertures 28 for optional registration with apertures 29 provided in an annular band 30, slidably disposed about the tube 18 in way-tacks 31. Rigidly mounted upon the band 30 is a toothed segment 32 or arcuate rack as it may be called, which is meshingly engaged with a gear 33 mounted on the end of an operating stem or rod 34 which extends radially outwardly through a packing gland 35 suitably secured in the casing 1. Mounted between the casing 1 and the tube 18 in axial alignment with the rod 34 are streamlined fairing plates p designed to prevent the rod 34 from creating turbulence in the flow of oil axially through the fluid passageway 22. It will be seen that, by suitable rotation of the rod 34, complete or partial registration of the apertures 28, 29, for free flow of fluid directly between the passageways 21, 22, may be optionally effected.

Suitably secured to the outer face of the head 7 by bolts 36 is a housing 37 for a gear box 38 formed thereby. The housing 37 is provided in its outwardly presented face with a bearing 39 and a bearing cap 40 for rotatably supporting a second driven shaft 41 axially aligned with the shafts 13, 16, said shaft 41 being connected at its outer end to any conventional type work (not shown), such as the wheels of an automobile.

The shaft 41 has formed on its inner end a longitudinally extending recess or bearing 42 within which extends the outer end of the driven shaft 16 having disposed thereabout an antifriction bearing or sleeve 43.

Mounted on the driven shaft 16 adjacent the outer face of the head 7 by means of a key 44 is a gear member 45 having integrally provided on its outer face a clutch-driving member 46 for optional engagement with a clutch-driven member 47 mounted by a spline 48 on the shaft 41, said member 47 being integrally provided with a gear 49. Operably connected to the member 47 is a yoke or clevis 50, which is, in turn, connected to a conventional type lever or operating arm (not shown).

Meshingly engaged with the gear 45 is an idler gear 51 mounted on a stub shaft 52 journalled in the head 7. Said gear 51, in turn, is meshingly engaged with a gear 53 integral with a unitary roller-like casting 54 rotatably mounted on a shaft 55 journalled at its ends in the head 7 and the outer wall of the housing 37. Said casting 48 is further provided with a second gear portion 56 spaced outwardly from the gear 53. Also securely mounted on the top side of the removable head 7 is a tubular oil-reservoir 57 provided at its upper end with a threaded closure plug 58 and communicating at its lower end through a drill-hole 59 with the interior of the casing 1.

In operation, a working fluid such as oil is poured through the reservoir 57 into the casing 1 for complete filling of the passageways 21, 22, and the chambers 23, 24. The driving shaft 13 is then rotated by operation of the prime mover causing the driving worm 25 to propel the fluid forwardly (reference being had to the right hand of Figure 1) in the passageway 21 into rotatable driving contact with the driven worm 27 thereby effecting rotation of the driven shaft 16. The fluid is thus driven by propulsion of the worm 25 forwardly into the chamber 24, thence rearwardly through the passageway 22 and returning to the passageway 21 through the chamber 23, which path of travel is designated by the arrows shown in Figure 1.

If it is desired that the particular work be moved or operated in a so-called forward direction, the lever arm will be so moved as to bring the clutch-driven member 47 into engagement with the clutch-driving member 46 (as shown in Figure 1), whereupon the rotation of the driving and driven shafts 13 and 16 is transmitted directly to the second driven shaft 41.

It is to be noted that rotation of the driven shaft 16 causes rotation of the idler gear 51 through engagement with the gear 45, and that the idler gear 51, in turn, effects rotation of the gears 53, 56.

For rotation of the driven shaft 41 in the opposite direction for reversing movement of the particular work, the lever arm is operated to move the clutch driven member 47 outwardly along the inner end of the shaft 41. Such movement disengages the members 46, 47, and brings the gear 49 into meshing engagement with the gear 56 of the casting 54, whereupon rotation, in a reverse direction of the shaft 41, is effected through the chain of gears 45, 51, 53, 56, and 49.

It is to be particularly noted that if the torque on the driven shaft 41 is increased, due to increase in the load, the fluid pressure within the passageway 21 will be commensurately increased and will set up a back pressure which will cause the adjustable worm 25 to twist and wind itself up, so to speak, on the shaft 13 into a tighter spiral so as to effect an alteration in its pitch through compression thereof. During this alteration in pitch the collar 26 will rotate about the shaft 13 and shift rearwardly toward the point of attachment $a$ of the worm 25. By such compression of the worm 25 the forward velocity of fluid propelled thereby will be decreased with a resulting increase in driving torque.

In order to reduce the degree of hydraulic coupling between the worms 25, 26, the rod 34 may be operated to slide the band 30 about the tube 18 so that the apertures 29 thereon are in total or partial (as necessary) registration with the apertures 28 of the tube 18. Complete registration of said apertures 28, 29, will effect a sufficient flow of fluid therethrough to result in a free idling of the driving shaft 13. If a high transmission reduction with low driving torques is required, as in the case of a slow moving car, the band 30 may be moved for partial registration only of the apertures 28, 29.

It should be understood that changes and modifications in the form, construction, arrangement, and combination of the several parts of hydraulic transmissions may be made and substituted for those herein shown and described without departing from the nature and principle of my invention.

Having thus described my invention, what I claim and desire to secure by Letters Patent is:

1. A fluid transmission device having a casing containing a body of fluid, a tube concentrically disposed within the casing in the formation of inner and outer concentric passageways, a driving shaft, a driven shaft rotatably disposed in axial alignment with the driving shaft for relative rotation with respect thereto, said shafts being disposed within the inner passageway, the improvement comprising a driving worm pinned at one end on the driving shaft and having an end ring at its other end for normal abutment against the end face of the driven shaft, said end ring being shiftably disposed on said driving shaft whereby said driving worm may be compressed by increase of fluid pressure, a driven worm rigidly mounted on the driven shaft, and work means connected to said driven shaft.

2. A fluid transmission device having a casing containing a body of fluid, a tube concentrically disposed within the casing in the formation of inner and outer concentric passageways, a driving shaft and a driven shaft rotatably disposed in axial alignment within the inner passageway, the improvement comprising a driving helical resilient worm pinned at one of its ends adjacent the outer end of the driving shaft and being free at its other end, a collar disposed upon the free end of the worm and being disposed upon the driving shaft for rotatable and shiftable movement thereon, whereby said driving worm may be compressed toward its pinned end through increased fluid pressure for alternating the pitch thereof, said driving worm being in constant marginal contact with the inner face of the tube, and a fluid impelled helical worm of fixed pitch rigidly mounted around and extending lengthwise along the driven shaft.

3. A fluid transmission device having a casing containing a body of fluid, a tube concentrically disposed within the casing in the formation of inner and outer concentric passageways, a driving shaft and a driven shaft rotatably disposed in axial alignment within the inner passageway, the improvement comprising a driving helical, resilient worm pinned at one of its ends adjacent the outer end of one of said shafts and being free at its other end, a collar rigidly secured to the free end of the worm and being rotatably and shiftably mounted upon the shaft to which said worm is pinned, whereby said worm may be compressed toward its pinned end through increased fluid pressure for alternating the pitch thereof, said worm furthermore being in constant marginal contact with the inner face of the tube, and a fluid impelled helical worm of fixed pitch rigidly mounted around and extending lengthwise along the other other shaft.

ERNST HALPERN.

REFERENCES CITED

The following references are of record in the file of this patent:

UNITED STATES PATENTS

| Number | Name | Date |
|---|---|---|
| 1,144,214 | Lake et al. | June 22, 1915 |
| 1,304,566 | Hornbrook | May 27, 1919 |
| 1,701,103 | Egy | Feb. 5, 1929 |
| 1,860,576 | Graupner | May 31, 1932 |
| 1,993,741 | Jandasek | Mar. 12, 1935 |
| 2,235,052 | Trier | Mar. 18, 1941 |
| 2,248,769 | Manley | July 8, 1941 |
| 2,256,018 | Custer | Sept. 16, 1941 |
| 2,293,268 | Quiroz | Aug. 18, 1942 |
| 2,382,034 | Wemp | Aug. 14, 1945 |
| 2,587,154 | Hartz | Feb. 26, 1952 |

FOREIGN PATENTS

| Number | Country | Date |
|---|---|---|
| 769,904 | France | Mar. 10, 1934 |
| 690,232 | Germany | Sept. 11, 1940 |
| 201,034 | Great Britain | July 26, 1923 |